United States Patent
Manente

(10) Patent No.: US 9,604,527 B2
(45) Date of Patent: Mar. 28, 2017

(54) SERIES-PARALLEL ELECTRIC HYBRID POWERTRAIN WITH MULTI FUEL CAPABILITIES

(71) Applicant: Aramco Overseas Company B.V., The Hague (NL)

(72) Inventor: Vittorio Manente, Neuilly sur Seine (FR)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 14/798,733

(22) Filed: Jul. 14, 2015

(65) Prior Publication Data
US 2017/0015187 A1    Jan. 19, 2017

(51) Int. Cl.
| | |
|---|---|
| B60K 6/44 | (2007.10) |
| B60K 6/26 | (2007.10) |
| B60K 6/28 | (2007.10) |
| B60K 5/00 | (2006.01) |

(52) U.S. Cl.
CPC ............... B60K 6/44 (2013.01); B60K 5/00 (2013.01); B60K 6/26 (2013.01); B60K 6/28 (2013.01)

(58) Field of Classification Search
CPC ... B60K 6/44; B60K 6/26; B60K 6/28; B60K 5/00
USPC ......................................... 180/65.25; 74/720
See application file for complete search history.

(56) References Cited

U.S. PATENT DOCUMENTS

| | | | |
|---|---|---|---|
| 3,525,874 A | 8/1970 | Toy | |
| 4,405,029 A * | 9/1983 | Hunt | B60K 6/24 180/303 |
| 5,845,731 A * | 12/1998 | Buglione | B60K 6/26 180/65.23 |
| 6,107,693 A * | 8/2000 | Mongia | F01K 21/047 290/4 R |

(Continued)

FOREIGN PATENT DOCUMENTS

| | | |
|---|---|---|
| WO | 2008122783 A2 | 10/2008 |
| WO | 2009117442 A2 | 9/2009 |

OTHER PUBLICATIONS

International Search Report and Written Opinion for related PCT application PCT/US2016/042221 dated Oct. 6, 2016.

*Primary Examiner* — J. Allen Shriver, II
*Assistant Examiner* — Brian Cassidy
(74) *Attorney, Agent, or Firm* — Bracewell LLP; Constance Gall Rhebergen

(57) ABSTRACT

A hybrid powertrain for powering a vehicle includes a micro turbine assembly with multi-fuel capabilities and a turbine drive shaft extending therefrom. The turbine drive shaft has a turbine engaged position where a turbine rotational output of the micro turbine assembly is transferred by the turbine drive shaft to wheels of the vehicle, and a turbine unengaged position where the turbine rotational output is independent from the wheels. A generator is selectively connected to the micro turbine assembly in parallel with a portion of the turbine drive shaft. A power storage device is chargeable by the generator and can drive an electric motor. A motor drive shaft has a motor engaged position where a motor rotational output of the electric motor is transferred by the motor drive shaft to the wheels, and a motor unengaged position where the motor rotational output is independent from the wheels.

16 Claims, 3 Drawing Sheets

(56) References Cited

U.S. PATENT DOCUMENTS

| | | | | |
|---|---|---|---|---|
| 6,213,234 B1* | 4/2001 | Rosen | ................. | B60K 6/24 |
| | | | | 180/65.245 |
| 6,308,639 B1 | 10/2001 | Donnelly et al. | | |
| 6,606,864 B2* | 8/2003 | MacKay | ................. | F02C 1/06 |
| | | | | 60/39.41 |
| 6,907,950 B2* | 6/2005 | Notsu | ................. | B60K 6/48 |
| | | | | 180/65.25 |
| 7,338,335 B1 | 3/2008 | Messano | | |
| 7,343,993 B2 | 3/2008 | Dong et al. | | |
| 7,637,836 B2* | 12/2009 | Watanabe | ............... | B60K 6/365 |
| | | | | 475/209 |
| 7,647,994 B1* | 1/2010 | Belloso | ................. | B60K 6/448 |
| | | | | 180/65.25 |
| 7,661,495 B2* | 2/2010 | Zohrer | ................. | B60K 6/387 |
| | | | | 180/65.22 |
| 8,499,874 B2 | 8/2013 | Dewis et al. | | |
| 8,552,575 B2* | 10/2013 | Teets | ................. | G08G 1/0129 |
| | | | | 290/40 C |
| 8,669,670 B2* | 3/2014 | Donnelly | ................. | F01D 15/10 |
| | | | | 290/1 A |
| 8,714,287 B2* | 5/2014 | Kim | ................. | B60K 6/40 |
| | | | | 180/65.22 |
| 8,900,080 B2* | 12/2014 | Kawasaki | ............... | B60K 6/48 |
| | | | | 475/210 |
| 8,983,697 B2* | 3/2015 | Toki | ................. | B60K 6/48 |
| | | | | 701/22 |
| 8,996,217 B2* | 3/2015 | Tanishima | ........... | B60L 11/123 |
| | | | | 180/65.245 |
| 9,099,882 B2* | 8/2015 | Lammers | ................. | H02J 7/007 |
| 9,266,521 B2* | 2/2016 | He | ................. | B60W 10/101 |
| 2002/0179350 A1* | 12/2002 | Li | ................. | B60K 6/36 |
| | | | | 180/65.25 |
| 2003/0104899 A1* | 6/2003 | Keller | ................. | B60K 6/24 |
| | | | | 477/2 |
| 2006/0219448 A1* | 10/2006 | Grieve | ............... | B60L 11/1816 |
| | | | | 180/65.31 |
| 2008/0196954 A1* | 8/2008 | Soliman | ................. | B60K 6/48 |
| | | | | 180/65.25 |
| 2008/0243322 A1* | 10/2008 | Nobumoto | ........... | B60W 10/02 |
| | | | | 701/22 |
| 2010/0251726 A1* | 10/2010 | Jones | ................. | F02C 7/32 |
| | | | | 60/773 |
| 2011/0017532 A1* | 1/2011 | Langford | ................. | B60K 6/24 |
| | | | | 180/65.21 |
| 2011/0288738 A1 | 11/2011 | Donnelly et al. | | |
| 2012/0159951 A1* | 6/2012 | Avery | ................. | F22B 27/14 |
| | | | | 60/670 |
| 2012/0201657 A1* | 8/2012 | Donnelly | ................. | F02C 6/20 |
| | | | | 415/123 |
| 2012/0228040 A1* | 9/2012 | Kyle | ................. | B60K 6/26 |
| | | | | 180/65.21 |
| 2012/0258838 A1* | 10/2012 | Hartz | ................. | B60K 6/40 |
| | | | | 477/5 |
| 2012/0324903 A1* | 12/2012 | Dewis | ................. | F02C 7/143 |
| | | | | 60/772 |
| 2013/0133480 A1* | 5/2013 | Donnelly | ................. | B60K 6/36 |
| | | | | 74/720 |
| 2016/0105078 A1* | 4/2016 | Santini | ................. | F02C 7/36 |
| | | | | 290/52 |
| 2016/0114668 A1* | 4/2016 | Zhang | ................. | B60K 6/12 |
| | | | | 74/732.1 |
| 2016/0297292 A1* | 10/2016 | Sato | ................. | B60K 6/54 |

* cited by examiner

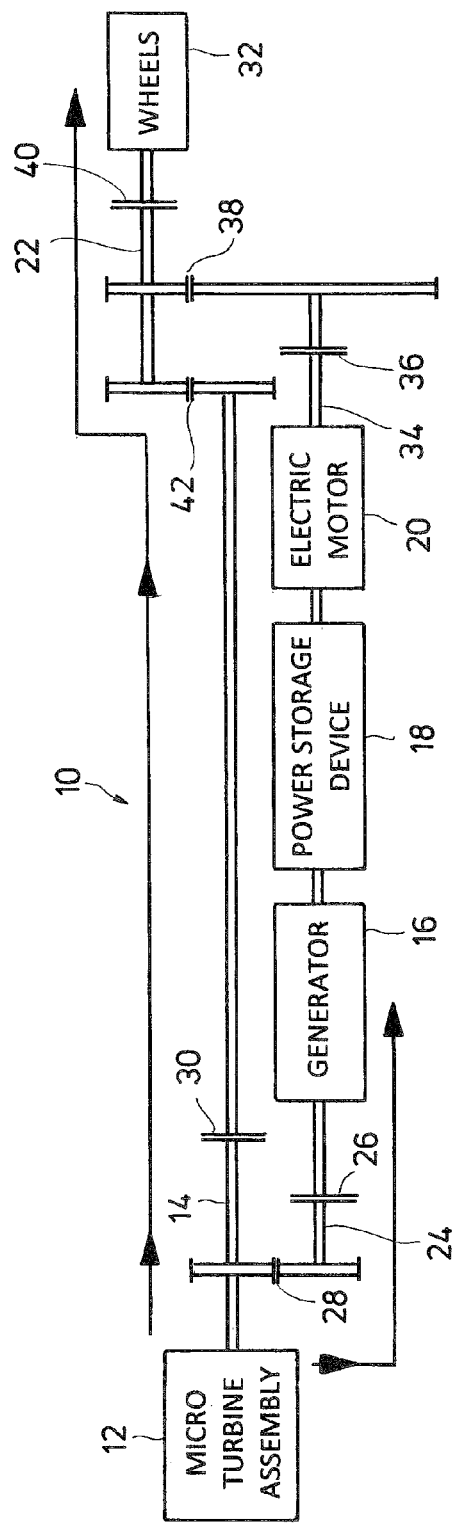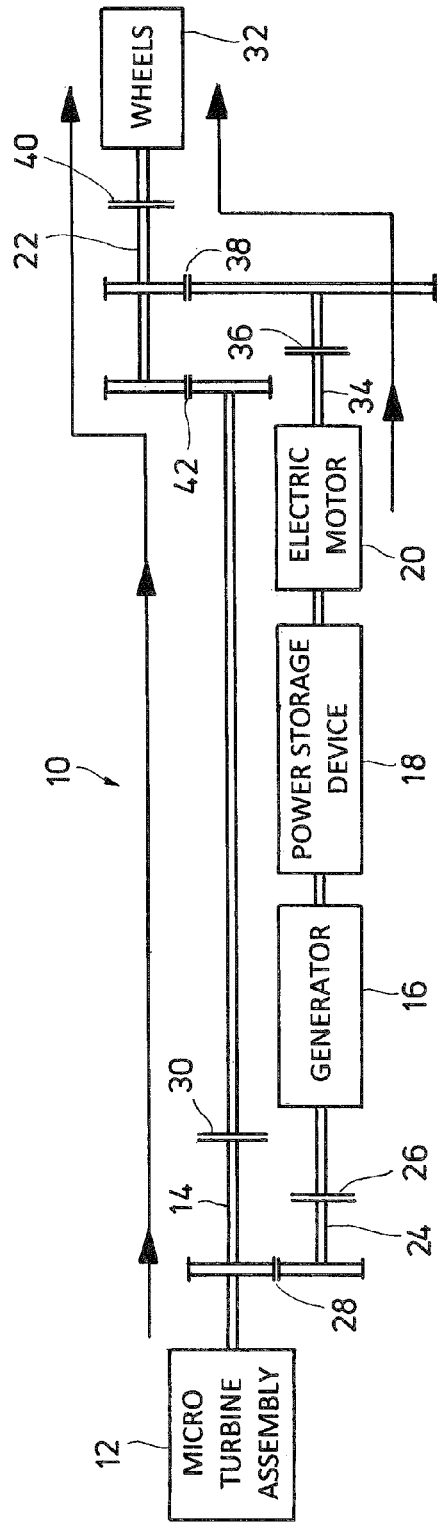

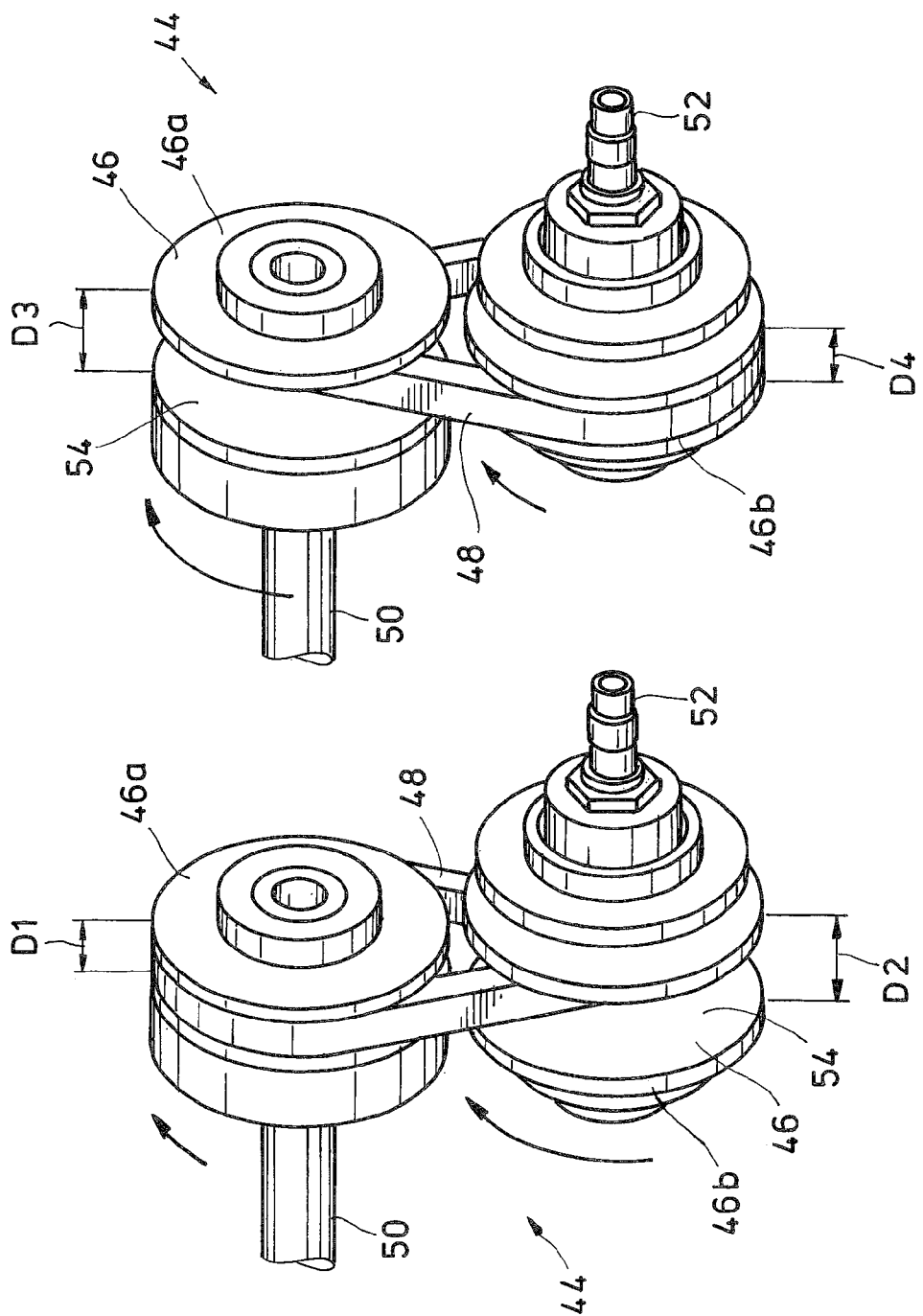

SERIES-PARALLEL ELECTRIC HYBRID POWERTRAIN WITH MULTI FUEL CAPABILITIES

BACKGROUND OF THE DISCLOSURE

1. Field of the Disclosure

The present disclosure relates in general to hybrid vehicles, and more particularly to a hybrid powertrain for vehicles.

2. Description of the Related Art

Due to the a trend towards an increased use of diesel fuel for powering vehicles, a phenomenon know as dieselization, it is forecasted that the demand for diesel will increase while the demand for gasoline will be decrease. The trend towards dieselization is the result of both a price difference between gasoline and diesel as well as a difference in efficiency between spark and compression ignition powertrains. A vehicle that has lower fuel cost per mile driven is preferable by most drivers.

Because refineries cannot change the production ratio among diesel, kerosene and gasoline without major additional costs, in the future there may be a surplus of gasoline. In order to increase the demand for gasoline so that each of these products proportionally, it would be desirable to increase the efficiency of engines using gasoline so that they have the same efficiency as conventional modern diesel engines and so that the gasoline vehicle has the same cost per mile driven as a diesel vehicle. As an alternative to traditional gasoline currently available at the pump, unrefined gasoline, such as naphtha, can be run directly in a compression ignition engine without need of major hardware modifications as compared to gasoline. By using naphtha, the well to tank $CO_2$ production is also minimized. Because of $CO_2$ concerns and because of a surplus of light fraction, naphtha could be introduced into the market as a fuel for vehicles. However, naphtha is not yet readily available on the market.

As an alternative to spark or compression ignition powertrains, fully electric vehicles have been introduced. Conventionally, light and medium duty vehicles experience a significant number of transients in their typical driving cycle. Fully electric vehicles have an excellent transient response. However, fully electric vehicles can have a negative environmental foot print when coal, oil, or gas is used to generate the electricity that charges the vehicle.

SUMMARY OF THE DISCLOSURE

Embodiments of this disclosure provide a powertrain capable of utilizing different type of fuels without requiring hardware modifications. Systems and method described herein can also achieve low fuel consumption and improved vehicle transient capabilities compared to some currently available powertrains. To achieve these improvements, a micro turbine is combined with an electric powertrain.

The micro turbine can provide multi fuel capabilities. The micro turbine can also provide fuel efficiency parts when operated at full power, while the electric powertrain allows for improved transient ability. Micro turbines in accordance with this disclosure have the ability to burn different type of commercial and non-commercial liquid fuels such as, for example, gasoline, ethanol, diesel, naphtha, kerosene, and biodiesel, without the need of hardware modifications. Micro turbines in accordance with this disclosure also have the ability to burn compressed natural gas, or liquefied petroleum gas, with some modification. Micro turbines in accordance with this disclosure, if slightly modified, can also handle gaseous fuels such as hydrogen, biogas, or natural-gas. The micro turbine can combined with a recuperator to further increase its power efficiency.

Embodiments of the powertrain of this disclosure include electric powertrains operated in parallel and series with the micro turbine. Electric powertrains have an excellent transient response since torque is immediately available as soon as the accelerator pedal is pushed. Also electric powertrains enable the vehicle to recuperate the inertia energy of the vehicle during deceleration or downhill which would otherwise be wasted as the recuperation of inertia energy is not possible with conventional internal combustion engines.

In an embodiment of this disclosure, a hybrid powertrain for powering a vehicle is disclosed. The hybrid powertrain includes a micro turbine assembly and a turbine drive shaft extending from the micro turbine assembly. The turbine drive shaft has a turbine engaged position where a turbine rotational output of the micro turbine assembly is transferred by the turbine drive shaft to wheels of a vehicle, and a turbine unengaged position where the turbine rotational output of the micro turbine assembly is independent from the wheels. A generator is selectively connected to the micro turbine assembly in parallel with a portion of the turbine drive shaft. A power storage device is connected to, and chargeable by, the generator. An electric motor is connected to, and drivable by, the power storage device. A motor drive shaft has a motor engaged position where a motor rotational output of the motor is transferred by the motor drive shaft to the wheels and a motor unengaged position where the motor rotational output of the motor is independent from the wheels.

In alternate embodiments, the micro turbine assembly has a recuperator, the recuperator being a heat exchanger having a first fluid path between a compressor section and a turbine section of the micro turbine assembly, and a second fluid path in fluid communication with an exhaust gas from the turbine section. The micro turbine assembly can have a multi-fuel turbine operated with a fuel selected from a group consisting of a gaseous fuel and a liquid fuel.

In other alternate embodiments, a generator drive shaft can have a generator engaged position where the turbine rotational output of the micro turbine assembly is transferred by the generator drive shaft to the generator, and a generator unengaged position where the turbine rotational output of the micro turbine assembly is independent from the generator. A wheels drive shaft can have a wheels engaged position where at least one of the turbine rotational output of the micro turbine assembly and the motor rotational output of the motor is transferred by the wheels drive shaft to the wheels, and a wheels unengaged position where both the turbine rotational output of the micro turbine assembly and the motor rotational output of the motor is independent from the wheels. The power storage device can be selectively connected to the wheels and be chargeable by rotation of the wheels.

In still other alternate embodiments, a turbine gear assembly can mechanically connect the turbine drive shaft with the wheels drive shaft. The turbine gear assembly can be a continuously variable transmission. A turbine clutch can be located along the turbine drive shaft and operable to move the turbine drive shaft between the turbine engaged position and the turbine unengaged position. A motor clutch can be located along the motor drive shaft and operable to move the motor drive shaft between the motor engaged position and the motor unengaged position. A wheels clutch can be located along the wheels drive shaft and operable to move the wheels drive shaft between the wheels engaged position and the wheels unengaged position. A generator clutch can be located along the generator drive shaft and operable to move the generator drive shaft between the generator engaged position and the generator unengaged position.

In another embodiment of this disclosure a hybrid powertrain for powering a vehicle includes a micro turbine assembly with a recuperator, the recuperator being a heat exchanger having a first fluid path between a compressor section and a turbine section of the micro turbine assembly and a second fluid path in fluid communication with an exhaust gas from the turbine section. A turbine drive shaft extends from the turbine section of the micro turbine assembly and is in selective mechanical connection with a wheels drive shaft. The wheels drive shaft is in selective mechanical connection with wheels of a vehicle. A generator is selectively connected to the micro turbine assembly in parallel with a portion of the turbine drive shaft. A power storage device is connected in series with, and chargeable by, the generator. An electric motor is connected in series with, and drivable by, the power storage device. A motor drive shaft extends from the electric motor and is in selective mechanical connection with the wheels drive shaft.

In alternate embodiments, the micro turbine assembly has a multi-fuel turbine operated with a fuel selected from a group consisting of a gaseous fuel, a liquid fuel, gasoline, ethanol, diesel, naphtha, kerosene, biodiesel, compressed natural gas, liquefied petroleum gas, hydrogen, biogas, and natural gas. A turbine gear assembly can mechanically connect the turbine drive shaft with the wheels drive shaft. The turbine gear assembly is a continuously variable transmission.

In other alternate embodiments, a generator drive shaft has a generator engaged position where a turbine rotational output of the micro turbine assembly is transferred by the generator drive shaft to the generator and a generator unengaged position where the turbine rotational output of the micro turbine assembly is independent from the generator. The wheels drive shaft can have a wheels engaged position where at least one of the turbine rotational output of the micro turbine assembly and a motor rotational output of the motor is transferred by the wheels drive shaft to the wheels, and a wheels unengaged position where both the turbine rotational output of the micro turbine assembly and the motor rotational output of the motor are independent from the wheels. The turbine drive shaft can have a turbine engaged position where the turbine rotational output of the micro turbine assembly is transferred by the turbine drive shaft to wheels of the vehicle, and a turbine unengaged position where the turbine rotational output of the micro turbine assembly is independent from the wheels. The motor drive shaft can have a motor engaged position where a motor rotational output of the motor is transferred by the motor drive shaft to the wheels and a motor unengaged position where the motor rotational output of the motor is independent from the wheels.

In yet other alternate embodiments, a turbine clutch can be located along the turbine drive shaft and operable to move the turbine drive shaft between the turbine engaged position and the turbine unengaged position. A motor clutch can be located along the motor drive shaft and operable to move the motor drive shaft between the motor engaged position and the motor unengaged position. A wheels clutch can be located along the wheels drive shaft and operable to move the wheels drive shaft between the wheels engaged position and the wheels unengaged position. A generator clutch can be located along the generator drive shaft and operable to move the generator drive shaft between the generator engaged position and the generator unengaged position.

In another alternate embodiment of this disclosure, a method for powering a vehicle with a hybrid powertrain includes providing a micro turbine assembly that has a turbine drive shaft extending from the micro turbine assembly. A generator is provided selectively connected to the micro turbine assembly in parallel with a portion of the turbine drive shaft. A power storage device is provided connected to the generator, and the power storage device is selectively charged with the generator. An electric motor is provided connected to the power storage device, and the electric motor is selectively driven with the power storage device. The turbine drive shaft is moved between a turbine engaged position where a turbine rotational output of the micro turbine assembly is transferred by the turbine drive shaft to wheels of a vehicle, and a turbine unengaged position where the turbine rotational output of the micro turbine assembly is independent from the wheels. A motor drive shaft is moved between a motor engaged position where a motor rotational output of the motor is transferred by the motor drive shaft to the wheels, and a motor unengaged position where the motor rotational output of the motor is independent from the wheels.

In alternate embodiments, the micro turbine assembly can have a recuperator with a first fluid path between a compressor section and a turbine section of the micro turbine assembly and a second fluid path in fluid communication with an exhaust gas from the turbine section, and the method can further include operating the recuperator as a heat exchanger drawing heat from the exhaust gas to heat the fluid in the first fluid path. The micro turbine assembly can have a multi-fuel turbine, and the method can further include operating the micro turbine assembly with a fuel selected from a group consisting of a gaseous fuel and a liquid fuel.

In other alternate embodiments, a generator drive shaft can be provided and the generator drive shaft can be selectively moved between a generator engaged position where the turbine rotational output of the micro turbine assembly is transferred by the generator drive shaft to the generator, and a generator unengaged position where the turbine rotational output of the micro turbine assembly is independent from the generator. A wheels drive shaft can be provided and the wheels drive shaft can be selectively moved between a wheels engaged position where at least one of the turbine rotational output of the micro turbine assembly and the motor rotational output of the motor is transferred by the wheels drive shaft to the wheels, and a wheels unengaged position where both the turbine rotational output of the micro turbine assembly and the motor rotational output of the motor is independent from the wheels.

BRIEF DESCRIPTION OF THE DRAWINGS

So that the manner in which the above-recited features, aspects and advantages of the invention, as well as others that will become apparent, are attained and can be understood in detail, a more particular description of the invention briefly summarized above may be had by reference to the embodiments thereof that are illustrated in the drawings that form a part of this specification. It is to be noted, however, that the appended drawings illustrate only preferred embodiments of the invention and are, therefore, not to be considered limiting of the invention's scope, for the invention may admit to other equally effective embodiments.

FIG. 1 is a schematic diagram of a hybrid powertrain for powering a vehicle, in accordance with an embodiment of this disclosure, showing power flow during an average cycle road load.

FIG. 2 is a schematic diagram of the hybrid powertrain of FIG. 1, showing power flow during a higher than average cycle road load.

FIG. 4 is a perspective view of an example continuously variable transmission for a hybrid powertrain for powering the vehicle, in accordance with an embodiment of this disclosure, shown in a high gear configuration.

FIG. 5 is a perspective view of the example continuously variable transmission of FIG. 4, shown in a low gear configuration.

DETAILED DESCRIPTION OF THE PREFERRED EMBODIMENTS

Figure 3:
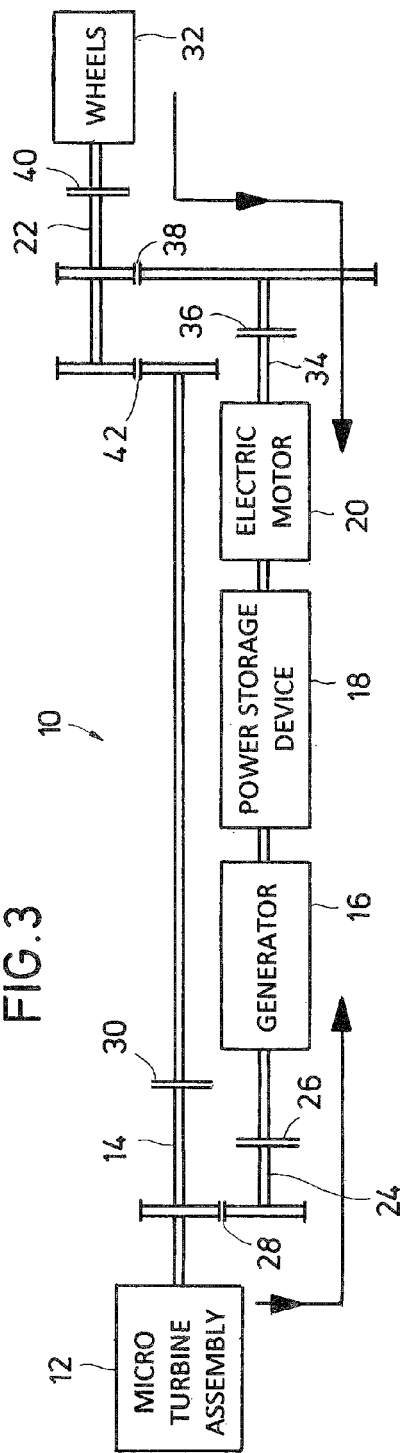
FIG. 3 is a schematic diagram of the hybrid powertrain of FIG. 1, showing power flow during a lower than zero cycle road load.

The Specification, which includes the Summary of Disclosure, Brief Description of the Drawings and the Detailed Description of the Preferred Embodiments, and the appended Claims refer to particular features (including process or method steps) of the invention. Those of skill in the art understand that the invention includes all possible combinations and uses of particular features described in the Specification. Those of skill in the art understand that the invention is not limited to or by the description of embodiments given in the Specification. The inventive subject matter is not restricted except only in the spirit of the Specification and appended Claims.

Those of skill in the art also understand that the terminology used for describing particular embodiments does not limit the scope or breadth of the invention. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a", "an", and "the" include plural references unless the context clearly indicates otherwise. As used, the words "comprise," "has," "includes", and all other grammatical variations are each intended to have an open, non-limiting meaning that does not exclude additional elements, components or steps. Embodiments of the present invention may suitably "comprise", "consist" or "consist essentially of" the limiting features disclosed, and may be practiced in the absence of a limiting feature not disclosed. For example, it can be recognized by those skilled in the art that certain steps can be combined into a single step.

Spatial terms describe the relative position of an object or a group of objects relative to another object or group of objects. The spatial relationships apply along vertical and horizontal axes. Orientation and relational words are for descriptive convenience and are not limiting unless otherwise indicated.

Where the Specification or the appended Claims provide a range of values, it is understood that the interval encompasses each intervening value between the upper limit and the lower limit as well as the upper limit and the lower limit. The invention encompasses and bounds smaller ranges of the interval subject to any specific exclusion provided.

Where reference is made in the Specification and appended Claims to a method comprising two or more defined steps, the defined steps can be carried out in any order or simultaneously except where the context excludes that possibility.

The term "selective connection," "selectively connected," and other like terms are used to indicate that an identified element can be connected to another identified element, at the selection of an operator.

Looking at FIG. 1, example hybrid powertrain 10 for powering a vehicle is shown. Hybrid powertrain 10 includes micro turbine assembly 12. Hybrid powertrain 10 further includes turbine drive shaft 14 extending from micro turbine assembly 12 and in selective mechanical connection with wheels drive shaft 22. Turbine drive shaft 14 can be selectively mechanically connected to micro turbine assembly 12. Hybrid powertrain 10 also has generator 16, power storage device 18 and electric motor 20, each of which are connected to each other in series, and each of which are selectively connected to micro turbine assembly 12 in parallel with a portion of turbine drive shaft 14. Generator 16, power storage device 18 and electric motor 20, are also selectively connected in series to micro turbine assembly 12 by a common portion of turbine drive shaft 14. Power storage device 18 can be, for example, one or more batteries and can be connected to, and chargeable by, generator 16. Power storage device 18 can also be selectively connected to, and chargeable by, rotation of wheels 32. Electric motor 29 is connected to, and drivable by, power storage device 18. Wheels drive shaft 22 selectively mechanically connects to turbine drive shaft 14 and to electric motor 20.

In order to selectively mechanically connect micro turbine assembly 12 to generator 16, generator drive shaft 24 extends from generator 16 to turbine drive shaft 14. Generator 16 is selectively connected to micro turbine assembly 12 with generator clutch 26. Generator clutch 26 is located along generator drive shaft 24 and is operable to move generator drive shaft 24 between the generator engaged position and the generator unengaged position. In the generator engaged position the turbine rotational output of micro turbine assembly 12 is transferred by the generator drive shaft 24 to generator 16. In the generator unengaged position turbine rotational output of micro turbine assembly 12 is independent from generator 16 so that the rotational output of micro turbine assembly 12 does not cause any rotational input to generator 16.

In addition to generator clutch 26, generator gear assembly 28 is also located mechanically between micro turbine assembly 12 and generator 16. Generator gear assembly 28 can change the ratio of rotation of the rotational output of micro turbine assembly 12 and the rotational input to generator 16.

Turbine clutch 30 is located along the turbine drive shaft and operable to move turbine drive shaft 14 between the turbine engaged position and the turbine unengaged position. In the turbine engaged position, a turbine rotational output of micro turbine assembly 12 is transferred by turbine drive shaft 14 to wheels 32 of the vehicle. In the turbine unengaged position, the turbine rotational output of micro turbine assembly 12 is independent from wheels 32 so that rotational output of micro turbine assembly 12 does not cause any rotation of wheels 32.

Hybrid powertrain 10 further includes motor drive shaft 34. Motor drive shaft 34 extends between electric motor 20 and wheels drive shaft 22. Motor drive shaft 34 has a motor engaged position where a motor rotational output of electric motor 20 is transferred by motor drive shaft 34 to wheels 32. In the motor engaged position, the rotation of wheels 32 can cause power to be stored in power storage device 18. Motor drive shaft 34 also has a motor unengaged position where the motor rotational output of electric motor 20 is independent from wheels 32 so that rotational output of electric motor 20 does not cause any rotation of wheels 32. In the motor unengaged position, the rotation of wheels 32 cannot cause power to be stored in power storage device 18. Motor clutch 36 is located along motor drive shaft 34 and is operable to move motor drive shaft 34 between the motor engaged position and the motor unengaged position. Motor gear assembly 38 can change the ratio of rotation of motor drive shaft 34 and wheels drive shaft 22. Motor gear assembly 38 can therefore be used to change the ratio of the rotational output of electric motor 20 and the rotational input to wheels drive shaft 22 and wheels 32. Alternately, motor gear assembly 38 can be used to change the ratio of rotational output from wheels drive shaft 22 and wheels 32 and the rotational input to electric motor 20.

Wheels clutch 40 is located along wheels drive shaft 22 and is operable to move wheels drive shaft 22 between the wheels engaged position and the wheels unengaged position. In the wheels engaged position, at least one of the turbine rotational output of the micro turbine assembly 12 and the motor rotational output of electric motor 20 can be transferred by wheels drive shaft 22 to wheels 32, or alternately, rotation of wheels 32 can be transferred by wheels drive shaft 22 to electric motor 20. In the wheels unengaged position, the turbine rotational output of micro turbine assembly 12 is independent from wheels 32, the motor rotational output of electric motor 20 is independent from wheels 32, and the rotation of wheels 32 is independent from rotational input to electric motor 20.

Hybrid powertrain 10 also includes turbine gear assembly 42 mechanically connecting turbine drive shaft 14 with wheels drive shaft 22. Turbine gear assembly 42 can change the ratio of rotation of the rotational output of micro turbine assembly 12 and the rotational input to wheels drive shaft 22 and wheels 32. In certain embodiments, turbine gear assembly 42 is a continuously variable transmission 44 (FIG. 4). In other alternate embodiments, generator gear assembly 28 or motor gear assembly 38 can be a continuously variable transmission 44.

Turning to FIG. 4, a continuously variable transmission 44 is a transmission that can provide an infinite number of effective gear ratios between two rotating members. Instead of using fixed gears, pulleys 46, such as cone shaped pulleys or adjustable pulleys, can be used with a chain or belt 48 running between pulleys 46. A change in diameter of pulleys 46 provides the variation in rotational ratios. Continuously variable transmission 44 can therefore provide a seamless transition between rotational ratios of input rotational member 50 and output rotational member 52. The diameters of pulleys 46 at the location where belt 48 passes over each pulley 46 can be automatically adjusted to provide a preferred balance of power and fuel efficiency.

As an example, looking at FIG. 4, in a high gear arrangement when traveling at speed, the input rotational member 50 turns input pulley 46a connected to output pulley 46b. As an example, when turbine gear assembly 42 is continuously variable transmission 44, input rotational member 50 can be turbine drive shaft 14 that is being rotated by micro turbine assembly 12 and output rotational member 52 can be wheels drive shaft 22 that rotates wheels 32. In the high gear arrangement, input pulley 46a is oriented so that the halves of input pulley 46a are spaced apart by a smaller input distance D1 and output pulley 46b is oriented so that the halves of output pulley 46b are spaced apart by a larger output distance D2. Due to the shallow conical facing surfaces 54 of the halves of pulleys 46, the diameter of input pulley 46a where belt 48 passes over input pulley 46a will be large compared to the diameter of output pulley 46b where belt 48 passes over output pulley 46b. Therefore, for every rotation of input rotational member 50, output rotational member 52 turns multiple times. The high gear arrangement of FIG. 4 can be used, for example, when the vehicle is cruising at normal operating speed.

Turning to FIG. 5, in a low gear arrangement, input pulley 46a is oriented so that the halves of input pulley 46a are spaced apart by a larger input distance D3 and output pulley 46b is oriented so that the halves of output pulley 46b are spaced apart by a smaller output distance D4. Due to the shallow conical facing surfaces 54 of the halves of pulleys 46, the diameter of input pulley 46a where belt 48 passes over input pulley 46a will be small compared to the diameter of output pulley 46b where belt 48 passes over output pulley 46b. Therefore, for every rotation of input rotational member 50, output rotational member 52 turns a fraction of a rotation. The low gear arrangement of FIG. 5 can be used, for example, when the vehicle is accelerating from a stop, traveling uphill, or pulling a heavy load. FIGS. 4-5 disclose an example continuously variable transmission 44. In alternate embodiments, other embodiments of a continuously variable transmission known in the art could alternately be used for turbine gear assembly 42, generator gear assembly 28 or motor gear assembly 38. In other alternate embodiments, traditional gear assemblies with set gear ratios can be used for turbine gear assembly 42, generator gear assembly 28 or motor gear assembly 38.

When turbine gear assembly 42 is a continuously variable transmission 44, micro turbine assembly 12 can be operated at an optimum operating speed so that the rotational output of micro turbine assembly 12 is at a constant speed. Continuously variable transmission 44 will allow for micro turbine assembly 12 to be operated at an optimum operating speed while providing an infinite rotational speed to wheels 32. This will allow for improved efficiency of micro turbine assembly 12 compared to some current powertrain configurations.

Figure 6:
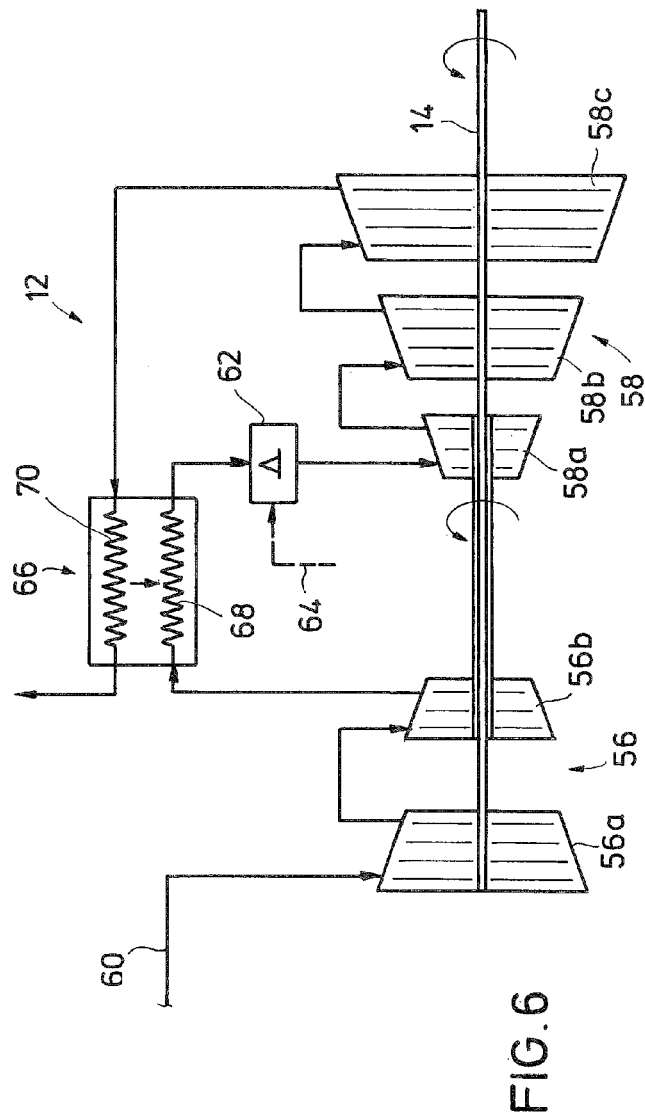
FIG. 6 is a schematic diagram of a micro turbine of a hybrid powertrain for powering the vehicle, in accordance with an embodiment of this disclosure.

Looking at FIG. 6, an example embodiment of micro turbine assembly 12 is shown. Micro turbine assembly 12 can have a multi-fuel turbine section that can be fueled by a gaseous fuel or a liquid fuel. As an example, micro turbine assembly 12 can be fueled by gasoline, ethanol, diesel, naphtha, kerosene, biodiesel, compressed natural gas, liquefied petroleum gas, hydrogen, biogas, or natural gas. Micro turbine assembly 12 includes compressor section 56 and turbine section 58. Compressor section 56 can include a single compressor or can include multiple compressors with varying pressures. In the example of FIG. 6, two compressors are shown. In such a configuration, the outer compressor 56a would be a lower pressure compressor and the inner compressor 56b would be a higher pressure compressor. Turbine section 58 can include a single turbine or multiple turbines with varying pressures. In the example of FIG. 6, there are three turbines in turbine section 58. In such an example, inner turbine 58a can be a higher pressure turbine and middle turbine 58b can be a lower pressure turbine. Inner turbine 58a and middle turbine 58b can power compressor section 56. Outer turbine 56c can be a turbine that provides the rotational output of micro turbine assembly 12 to turbine drive shaft 14.

Air intake 60 of micro turbine assembly 12 can deliver air to compressor section 56. Compressed air output from compressor section 56 can be mixed with a fuel in combustion chamber 62 where the mixture combusts. Fuel can be delivered to combustion chamber 62 by way of fuel input 64. The combustion within combustion chamber 62 will generate a high temperature and high pressure gas that will enter turbine section 58 where the high temperature and high pressure gas will work to produce a rotational output of turbine section 58.

In the example of FIG. 6, micro turbine assembly 12 includes recuperator 66. Recuperator 66 is a heat exchanger having a first fluid path 68 that coveys air between compressor section 56 and turbine section 58. Recuperator 66 also has a second fluid path 70 that is in fluid communication with an exhaust gas from turbine section 58. Exhaust gas from turbine section 58 is at a higher temperature than the air in first fluid path 68. By using recuperator 66 to draw heat from the exhaust gas to heat the air in the first fluid path, the efficiency of micro turbine assembly 12 can be increased.

In an example of operation, looking at FIG. 1, during an average cycle road load, micro turbine assembly 12 can be sized to work at full power in steady state. As an example, the target power to be generated by micro turbine assembly 12 can be equal to the average road load plus a margin of additional power. The margin can be, for example, 25% to 50% of the average road load. Therefore when the load required by the vehicle is equal to the road load, such as when the vehicle is operating at a cruising speed over relatively flat terrain, a portion of the power generated by micro turbine assembly 12 is provided to wheels 32 and the remaining power generated by micro turbine assembly 12 is used to charge power storage device 18. In this configuration, electric motor 20 is independent from wheels 32 and is therefore not connected with wheels 32. During situations where the road load is lower than the average cycle road load but the wheels still require power, such as traveling downhill, a greater portion of the power from micro turbine assembly 12 is directed towards power storage device 18, but the flow of power as seen in FIG. 1 is otherwise unchanged.

In the example configuration of FIG. 1, turbine clutch 30 is engaged so that turbine drive shaft 14 is in the turbine engaged position and the turbine rotational output of micro turbine assembly 12 is transferred by turbine drive shaft 14 to wheels 32 of the vehicle. Wheels clutch 40 is engaged so that wheels drive shaft 22 is in the wheels engaged position so that the turbine rotational output of the micro turbine assembly 12 can be transferred by wheels drive shaft 22 to wheels 32. Generator clutch 26 is engaged so that generator drive shaft 24 is in the generator engaged position so that the turbine rotational output of micro turbine assembly 12 is transferred by the generator drive shaft 24 to generator 16. Motor clutch 36 is disengaged so that motor drive shaft 34 is in the motor unengaged position so that the motor rotational output of electric motor 20 is independent from wheels 32 and does not cause any rotation of wheels 32. Also, when motor clutch 36 is disengaged, the rotation of wheels 32 cannot cause power to be stored in power storage device 18.

During a higher than average cycle road load, there is a greater power required to rotate wheels 32. This could be, for example, during accelerations or during an uphill drive. In this case, a greater fraction of the energy from micro turbine assembly 12 is used to power wheels 32. If the power produced by micro turbine assembly 12 is not enough, additional torque can be generated by electric motor 20 and provided to wheels 32 and both micro turbine assembly 12 and electric motor 20 can be used to rotate wheels 32.

Looking at the example configuration of FIG. 2, when both micro turbine assembly 12 and electric motor 20 are used to rotate wheels 32, turbine clutch 30 is engaged so that turbine drive shaft 14 is in the turbine engaged position and the turbine rotational output of micro turbine assembly 12 is transferred by turbine drive shaft 14 to wheels 32 of the vehicle. Motor clutch 36 is engaged so that motor drive shaft 34 is in the motor engaged position so that the motor rotational output of electric motor 20 is transferred by motor drive shaft 34 to wheels drive shaft 22 and wheels 32. Wheels clutch 40 is engaged so that wheels drive shaft 22 is in the wheels engaged position so that the turbine rotational output of the micro turbine assembly 12 and the motor rotational output of electric motor 20 can be transferred by wheels drive shaft 22 to wheels 32. Generator clutch 26 is disengaged so that generator drive shaft 24 is in the generator unengaged position so that the turbine rotational output of micro turbine assembly 12 is independent of generator 16 and does not provide rotational input to generator 16.

Looking at FIG. 3, when the wheels do not require power, such as during braking or coasting, both the power produced by micro turbine assembly 12 and the vehicle inertia energy that continues to cause wheels 32 to rotate are used to charge power storage device 18. The process of recuperating the inertia of the vehicle to charge the power storage device can be called regeneration. During regeneration, turbine clutch 30 is disengaged so that turbine drive shaft 14 is in the turbine unengaged position and the turbine rotational output of micro turbine assembly 12 is independent of wheels 32. Generator clutch 26 is engaged so that generator drive shaft 24 is in the generator engaged position and the turbine rotational output of micro turbine assembly 12 is transferred by the generator drive shaft 24 to generator 16. Wheels clutch 40 is engaged so that wheels drive shaft 22 is in the wheels engaged position so that the rotation of wheels 32 can be transferred by wheels drive shaft 22 to motor drive shaft 34. Motor clutch 36 is engaged so that motor drive shaft 34 is in the motor engaged position so that the rotation of wheels 32 is transferred by motor drive shaft 34 to electric motor 20 for storing power in power storage device 18.

The efficiency of hybrid powertrain 10 when using regeneration is greater than the efficiency of hybrid powertrain 10 when not using regeneration. In addition, a higher percentage of use of micro turbine assembly 12 compared to usage of electric motor 20 improves the overall efficiency of hybrid powertrain 10. Therefore, the efficiency of hybrid powertrain 10 can be optimized by sizing the micro turbine assembly 12 to operate at full power in steady state so that only a minimal usage of electric motor 20 is expected. Ideally, when micro turbine assembly 12 is being operated at full power, most of the rotational output of micro turbine assembly 12 is used to rotate wheels 32 and a remaining fraction of the rotational output of micro turbine assembly 12 can be used to charge power storage device 18.

Therefore, as described herein, hybrid powertrain 10 is capable of handling different types of fuels without a need for changing hardware, and is also capable of working in a transient mode efficiently with low fuel consumption. In embodiments of this disclosure, micro turbine assembly 12 can be operated at optimum efficiency and through the use of continuously variable transmission 44 can directly rotate wheels 32 without first transferring the rotational output of micro turbine assembly 12 to a motor that in turn would rotate wheels 32. In embodiments of this disclosure, micro turbine assembly 12 can also be continuously operated at optimum efficiency by its ability to transfer varying amounts of power to either wheels 32 or generator 16 through the use of various gears and clutches, as needed, instead of varying the power provided to either wheels 32 or generator 16 by changing the operating conditions of micro turbine assembly 12 itself.

Embodiments described herein, therefore, are well adapted to carry out the objects and attain the ends and advantages mentioned, as well as others inherent therein. While a presently preferred embodiment has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A hybrid powertrain for powering a vehicle, the hybrid powertrain comprising:
   a micro turbine assembly;
   a turbine drive shaft extending from the micro turbine assembly, the turbine drive shaft having a turbine engaged position where a turbine rotational output of the micro turbine assembly is transferred by the turbine drive shaft to wheels of the vehicle, and a turbine unengaged position where the turbine rotational output of the micro turbine assembly is independent from the wheels, wherein the micro turbine assembly is operable at an optimum operating speed both when the turbine drive shaft is in the turbine engaged position and the turbine unengaged position;
   a generator selectively connected to the micro turbine assembly in parallel with a portion of the turbine drive shaft;
   a power storage device connected to, and chargeable by, the generator;
   an electric motor connected to, and drivable by, the power storage device;
   a motor drive shaft having a motor engaged position where a motor rotational output of the electric motor is transferred by the motor drive shaft to the wheels and a motor unengaged position where the motor rotational output of the electric motor is independent from the wheels;
   a generator drive shaft, the generator drive shaft having a generator engaged position where the turbine rotational output of the micro turbine assembly is transferred by the generator drive shaft to the generator and a generator unengaged position where the turbine rotational output of the micro turbine assembly is independent from the generator; wherein the micro turbine assembly is operable at the optimum operating speed both when the generator drive shaft is in the generator engaged position and the generator unengaged position; and wherein
   the power storage device is selectively connected to the wheels and is chargeable by rotation of the wheels simultaneously with the generator drive shaft being in the generator engaged position.

2. The hybrid powertrain according to claim 1, wherein the micro turbine assembly has a recuperator, the recuperator being a heat exchanger having a first fluid path between a compressor section and a turbine section of the micro turbine assembly and a second fluid path in fluid communication with an exhaust gas from the turbine section.

3. The hybrid powertrain according to claim 1, wherein the micro turbine assembly has a multi-fuel turbine operated with a fuel selected from a group consisting of a gaseous fuel and a liquid fuel.

4. The hybrid powertrain according to claim 1, further comprising a wheels drive shaft, the wheels drive shaft having a wheels engaged position where at least one of the turbine rotational output of the micro turbine assembly and the motor rotational output of the electric motor is transferred by the wheels drive shaft to the wheels and a wheels unengaged position where both the turbine rotational output of the micro turbine assembly and the motor rotational output of the electric motor is independent from the wheels.

5. The hybrid powertrain according to claim 4, further comprising a turbine gear assembly mechanically connecting the turbine drive shaft with the wheels drive shaft.

6. The hybrid powertrain according to claim 5, wherein the turbine gear assembly is a continuously variable transmission.

7. The hybrid powertrain according to claim 1, further comprising:
   a turbine clutch located along the turbine drive shaft and operable to move the turbine drive shaft between the turbine engaged position and the turbine unengaged position;
   a motor clutch located along the motor drive shaft and operable to move the motor drive shaft between the motor engaged position and the motor unengaged position;
   a wheels clutch located along a wheels drive shaft and operable to move the wheels drive shaft between a wheels engaged position and a wheels unengaged position; and
   a generator clutch located along a generator drive shaft and operable to move the generator drive shaft between a generator engaged position and a generator unengaged position.

8. A hybrid powertrain for powering a vehicle, the hybrid powertrain comprising:
   a micro turbine assembly with a recuperator, the recuperator being a heat exchanger having a first fluid path between a compressor section and a turbine section of the micro turbine assembly and a second fluid path in fluid communication with an exhaust gas from the turbine section;
   a turbine drive shaft extending from the turbine section of the micro turbine assembly and in selective mechanical connection with a wheels drive shaft, the wheels drive shaft in selective mechanical connection with wheels of the vehicle;
   a generator selectively connected to the micro turbine assembly in parallel with a portion of the turbine drive shaft;
   a generator drive shaft, the generator drive shaft having a generator engaged position where the turbine rotational output of the micro turbine assembly is transferred by the generator drive shaft to the generator and a generator unengaged position where the turbine rotational output of the micro turbine assembly is independent from the generator; wherein the micro turbine assembly is operable at the optimum operating speed both when the generator drive shaft is in the generator engaged position and the generator unengaged position;
   a power storage device connected in series with, and chargeable by, the generator, the power storage device further chargeable by rotation of the wheels simultaneously with the generator drive shaft being in the generator engaged position;
an electric motor connected in series with, and drivable by, the power storage device; and
a motor drive shaft extending from the electric motor and in selective mechanical connection with the wheels drive shaft.

9. The hybrid powertrain according to claim 8, wherein the micro turbine assembly has a multi-fuel turbine operated with a fuel selected from a group consisting of a gaseous fuel, a liquid fuel, gasoline, ethanol, diesel, naphtha, kerosene, biodiesel, compressed natural gas, liquefied petroleum gas, hydrogen, biogas, and natural gas.

10. The hybrid powertrain according to claim 8, wherein:
the wheels drive shaft has a wheels engaged position where at least one of the turbine rotational output of the micro turbine assembly and a motor rotational output of the electric motor is transferred by the wheels drive shaft to the wheels, and a wheels unengaged position where both the turbine rotational output of the micro turbine assembly and the motor rotational output of the electric motor are independent from the wheels;
the turbine drive shaft has a turbine engaged position where the turbine rotational output of the micro turbine assembly is transferred by the turbine drive shaft to the wheels of the vehicle, and a turbine unengaged position where the turbine rotational output of the micro turbine assembly is independent from the wheels; and
the motor drive shaft has a motor engaged position where the motor rotational output of the electric motor is transferred by the motor drive shaft to the wheels and a motor unengaged position where the motor rotational output of the electric motor is independent from the wheels.

11. The hybrid powertrain according to claim 10, further comprising:
a turbine clutch located along the turbine drive shaft and operable to move the turbine drive shaft between the turbine engaged position and the turbine unengaged position;
a motor clutch located along the motor drive shaft and operable to move the motor drive shaft between the motor engaged position and the motor unengaged position;
a wheels clutch located along the wheels drive shaft and operable to move the wheels drive shaft between the wheels engaged position and the wheels unengaged position; and
a generator clutch located along the generator drive shaft and operable to move the generator drive shaft between the generator engaged position and the generator unengaged position.

12. The hybrid powertrain according to claim 8, further comprising a turbine gear assembly mechanically connecting the turbine drive shaft with the wheels drive shaft, wherein the turbine gear assembly is a continuously variable transmission.

13. A method for powering a vehicle with a hybrid powertrain, the method comprising:
providing a micro turbine assembly that has a turbine drive shaft extending from the micro turbine assembly;
providing a generator selectively connected to the micro turbine assembly in parallel with a portion of the turbine drive shaft;
providing a power storage device connected to the generator, and selectively charging the power storage device with the generator;
providing an electric motor connected to the power storage device, and selectively driving the electric motor with the power storage device;
moving the turbine drive shaft between a turbine engaged position where a turbine rotational output of the micro turbine assembly is transferred by the turbine drive shaft to wheels of the vehicle, and a turbine unengaged position where the turbine rotational output of the micro turbine assembly is independent from the wheels, wherein the micro turbine assembly is operated at an optimum operating speed both when the turbine drive shaft is in the turbine engaged position and the turbine unengaged position;
moving a motor drive shaft between a motor engaged position where a motor rotational output of the electric motor is transferred by the motor drive shaft to the wheels, and a motor unengaged position where the motor rotational output of the electric motor is independent from the wheels;
providing a generator drive shaft, the generator drive shaft having a generator engaged position where the turbine rotational output of the micro turbine assembly is transferred by the generator drive shaft to the generator and a generator unengaged position where the turbine rotational output of the micro turbine assembly is independent from the generator, wherein the micro turbine assembly is operated at the optimum operating speed both when the generator drive shaft is in the generator engaged position and the generator unengaged position; and wherein
the power storage device is selectively connected to the wheels and is chargeable by rotation of the wheels simultaneously with the generator drive shaft being in the generator engaged position.

14. The method according to claim 13, wherein the micro turbine assembly has a recuperator with a first fluid path between a compressor section and a turbine section of the micro turbine assembly and a second fluid path in fluid communication with an exhaust gas from the turbine section, the method further comprising operating the recuperator as a heat exchanger drawing heat from the exhaust gas to heat the fluid in the first fluid path.

15. The method according to claim 13, wherein the micro turbine assembly has a multi-fuel turbine, the method further comprising operating the micro turbine assembly with a fuel selected from a group consisting of a gaseous fuel and a liquid fuel.

16. The method according to claim 13, further comprising providing a wheels drive shaft and selectively moving the wheels drive shaft between a wheels engaged position where at least one of the turbine rotational output of the micro turbine assembly and the motor rotational output of the electric motor is transferred by the wheels drive shaft to the wheels, and a wheels unengaged position where both the turbine rotational output of the micro turbine assembly and the motor rotational output of the electric motor is independent from the wheels.

* * * * *